United States Patent [19]

Tsuchiya et al.

[11] 4,242,475
[45] Dec. 30, 1980

[54] PROCESS FOR PRODUCING NOVEL CURABLE RESIN CAPABLE OF BEING CURED BY THE EXPOSURE TO HEAT OR RADIATION AND CURABLE COATING COMPOSITION CONTAINING SAID CURABLE RESIN

[75] Inventors: Shozo Tsuchiya, Tokyo; Hideo Hayashi, Yokohama, both of Japan

[73] Assignee: Nippon Oil Company, Limited, Tokyo, Japan

[21] Appl. No.: 3,150

[22] Filed: Jan. 15, 1979

[30] Foreign Application Priority Data

Jan. 23, 1978 [JP] Japan .................................. 53-5277

[51] Int. Cl.$^3$ .................... C08F 283/00; C08G 63/38
[52] U.S. Cl. .................... 525/534; 528/205; 260/DIG. 38
[58] Field of Search .................... 528/205; 525/534

[56] References Cited

U.S. PATENT DOCUMENTS

| | | | |
|---|---|---|---|
| 3,408,253 | 10/1968 | Eckert et al. | 528/205 |
| 3,639,499 | 2/1972 | Snodgrass et al. | 525/392 |
| 3,644,537 | 2/1972 | Dannels et al. | 528/205 |
| 3,993,626 | 11/1976 | Laurito | 528/205 |
| 4,085,085 | 4/1978 | Tsuchiya et al. | 525/502 |

*Primary Examiner*—Edward M. Woodberry
*Attorney, Agent, or Firm*—Jordan and Hamburg

[57] ABSTRACT

A process for producing a curable resin is provided which comprises the steps of polymerizing a five-member cyclic compound (A) having an unsaturated conjugated double bond and represented by the general formula (A) given below;

GENERAL FORMULA (A):

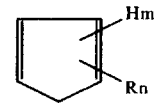

(wherein R is an organic residue having from 1 to 3 carbon atoms; m and n are integers and are in the relation of $m+n=6$)

or Diels-Alder addition product thereof (A) with at least one phenolic compound (B) selected from the group consisting of monohydric and polyhydric phenols and alkyl substituents thereof to obtain a resin (I) having at least one phenolic hydroxyl group and an average molecular weight of from 300 to 2000; hydrogenating said resin (I) to convert the aromatic ring of the phenolic compound unit into the cyclohexane structure thereby to obtain a resin (II); and esterifying said resin (II) with an $\alpha$, $\beta$-unsaturated carboxylic acid (C). A curable coating composition is also provided which comprises as vehicle the above curable resin.

19 Claims, No Drawings

PROCESS FOR PRODUCING NOVEL CURABLE RESIN CAPABLE OF BEING CURED BY THE EXPOSURE TO HEAT OR RADIATION AND CURABLE COATING COMPOSITION CONTAINING SAID CURABLE RESIN

BACKGROUND OF THE INVENTION

1. Field of the Invention

The present invention relates to a process for producing a curable resin and a curable coating composition containing said resin, and more particularly to a process for producing a novel curable resin capable of being cured by the exposure to radiation or heat and a curable coating composition containing said resin.

2. Prior Art

Recently, a so-called curable resin which reacts to form linked cross structures by the exposure to radiation or heat has been frequently used as an important component for solvent-free compositions in the technical field of coating compositions including paints and inks and also in the technical field of adhesives.

For example, the demand for the improvement of printing speed has been increasing along with the development of the printing technology. With the increase in the demand for higher printing speed, the serious demand for the improved drying speed (curing speed) of printing inks has been more and more growing. In the conventional high speed printing, the printed products are dried by direct-heating system or by hot-air system as the means for promoting the drying of the printed products. From 30 to 40% of the solvent contained in the printing inks which are used in such heat-set printing as mentioned above is evaporated by heating to dry the inks. Therefore, a part of the solvent vapor produced in the printing factories causes pollution problems more often than ever.

Therefore, printing inks, of such a type as can be dried by some means or other without the need for discharging such volatile material as mentioned above, have been desired by those skilled in the art.

Under these circumstances, there are demands for printing inks which can be dried without being accompanied by the evaporation of solvent, such as ultraviolet ray curing inks or thermosetting type nonsolvent inks. In fact, there have already been made proposals for such printing inks.

For example, in Kokai Pat. Publication No. 124133/74 (Unexamined Patent Application Publication No. 124133/74), it is disclosed that excellent mutual solubility and curing property can be attained when a resin obtained by esterifying copolymer resin of dicyclopentadiene and allyl alcohol with (meth-)acrylic acid, is used as curable ink.

However, when the resin disclosed in the above cited Kokai Patent Gazette is used as the curable coating composition, drying speed is not sufficient and, the exposure sensitivity thereof is poor; thus, the printing inks of this type do not meet the original requirement of the printing inks for high speed printing.

OBJECTS AND SUMMARY OF THE INVENTION

An object of the present invention is to provide a process for producing a novel curable resin having excellent property of being cured without being accompanied with the evaporation of solvent, and to provide a curable coating composition which contains said resin.

Another object of this invention is to provide a process for producing a curable resin capable of being very quickly cured by heat or radiation, and to provide a curable coating composition, for example for printing inks, which contains said resin.

A further object of this invention is to provide a process for producing a curable resin having excellent curing speed and preferable properties such as fluidity or emulsifying property when used in the composition for printing inks, and to provide a curable coating composition for printing inks containing said resin.

The above mentioned objects and other objects of this invention will be clarified from the below given description.

The present invention provides a process for producing a curable resin which comprises the steps of:

(i) polymerizing a five-member cyclic compound (A) having unsaturated conjugated double bonds and represented by the general formula (A) given below;

GENERAL FORMULA (A):

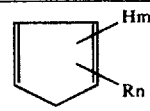

wherein R is an organic residue having from 1 to 3 carbon atoms; m and n are integers and are in the relation of $m+n=6$ or Diels-Alder addition product thereof (A) with at least one phenolic compound (B) selected from the group consisting of monohydric and polyhydric phenols and alkyl substituents thereof to obtain a resin (I) having at least one phenolic hydroxyl group and an average molecular weight of from 300 to 2000; (ii) hydrogenating said resin (I) to convert the aromatic ring of the phenolic group into the cyclohexane structure thereby to obtain a resin (II); and (iii) esterifying said resin (II) with an $\alpha,\beta$-unsaturated carboxylic acid (C) thereby to obtain the curable resin (III).

According to the present invention, there is also provided a coating composition containing as vehicle said resin (III).

DESCRIPTION OF THE INVENTION

The process of the present invention will now be described in detail hereinbelow.

Firstly, the step (i) for preparing said resin (I) will be described. In preparation of said resin (I), one or more of the compounds selected from among cyclopentadiene, dicyclopentadiene, tricyclopentadiene and tetracyclopentadiene and the lower alkyl substituents thereof having from 1 to 3 carbon atoms (such as methyldicyclopentadiene) may be preferably used as the component (A). However, in order to obviate complicated descriptions, the component (A) will be represented by dicyclopentadiene hereinbelow. It should be apparent to those skilled in the art that dicyclopentadiene, which will be specifically mentioned throughout the following descriptions, may be substituted by any of the compounds (A) represented by the GENERAL FORMULA (A) set forth above without departing from the spirit of the present invention.

In the process of the present invention, the resin (I) may be prepared from dicyclopentadiene (Component (A)) and a phenol (Component (B)) by mixing them together and heating them in the presence or absence of an inert solvent at a temperature of from 150 to 350° C., preferably from 180 to 300° C., or by reacting the components (A) and (B) in the presence of a Friedel-Crafts type catalyst such as boron trifluoride or aluminum chloride at a temperature of from —(minus) 20° C. to 100° C. The molar ratio of the component (A) and the component (B) in the above mentioned reaction is optionally selected within the range of from 30/70 to 95/5, but in order to attain the objects of the present invention it is preferable that the molar ratio of the component (A) and the component (B) be between 40/60 to 80/20.

The average molecular weight (number average molecular weight) of the thus prepared resin ranges from 300 to 2000, preferably from 350 to 1000, and most preferably from 400 to 600. Said resin (I) may be in a solid or semisolid state at room temperature. The softening point of said resin can be appropriately controlled by selecting reaction conditions such as reaction time or reaction temperature in accordance with the purposes of the application thereof and can be controlled within the temperature range of from 50 to 200° C. In preparing the above mentioned resin (I), it is not always necessary that the purity of the component (A) should be high. For example, it may be possible to use a fraction whose dicyclopentadiene purity is around 85% or higher. Such a fraction may be obtained by thermally dimerizing cyclopentadiene or methylcyclopentadiene contained in a $C_5$ fraction produced by cracking petroleum fraction such as naphtha at high temperature and by removing most of $C_5$ fractions such as $C_5$ olefin or $C_5$ paraffin by means of distillation.

Further, the component (A) may contain an additional by-product oil fraction mainly composed of an unsaturated aromatic hydrocarbon having a polymerizable double bond at its side chain, such as styrene, α-methystyrene, vinyltoluene, vinylxylene or an unsaturated aromatic hydrocarbon having a polymerizable double bond at its condensed ring, such as, indene and methylindene, or a mixture of two or more of said unsaturated aromatic compounds in an amount of less than that of the component dicyclopentadiene.

The phenols usable as the component (B) include monohydric and polyhydric phenols or alkyl substituents thereof (preferably having 1 to 9 carbon atoms), such as one or more selected from the group consisting of phenol, cresol, xylenol, tertbutylphenol, nonylphenol, resorcinol and bisphenol.

In the present invention, it may be possible to add to and copolymerize with the components (A) and (B) an additional compound (D) having from 3 to 20 carbon atoms and having both reactive carbon-carbon double bond or bonds and at least one alcoholic hydroxyl group within one and the same molecule, typical examples of said additional compound (D) being allyl alcohol, 2-hydroxyethyl (meth-)acrylate and 1,4-butenediol and a mixture thereof. The amount of said additional compound (D) may be less than 40 Mol. %, preferably less than 20 Mol. %, based on the weight of said component (A).

The resin (I) which is obtained as mentioned above contains at least one phenolic hydroxyl group. The resin (I) is then subjected to hydrogenation reaction to convert the aromatic ring into the cyclohexane structure. The hydrogenation reaction may be effected in the presence of a commonly known hydrogenation catalyst such as nickel, copper-chromium, platinum or palladium system catalyst at a temperature of from room temp. to 280° C. under a hydrogen pressure of from atmospheric pressure to 150 Kg/cm². This reaction may be effected under the conditions selected within a relatively wide range as has been mentioned above, and may be effected with the use of an inert solvent such as hydrocarbons, alcohols or the like.

It is desirable that most of the aromatic rings be hydrogenated, for instance about 70 % or more of the aromatic rings be hydrogenated, and it is preferable that substantially all of the rings be hydrogenated. However, if the hydrogenation proceeds excessively, the number of the hydroxyl groups in the resin tends to decrease, hence resulting in disadvantageous effects.

The resin (II), which is obtained by the foregoing hydrogenation step, is then reacted with an $\alpha,\beta$-unsaturated carboxylic acid component (C) under the conventional esterification conditions known per se in the presence or absence of a catalyst to esterify the alcoholic hydroxyl groups of the resin (II) with the carboxylic groups of the $\alpha,\beta$-unsaturated carboxylic acid whereby the curable resin (III) of the present invention is obtained.

The esterification reaction temperature is not limited, and may range generally within 20 to 150° C., preferably from 80 to 130° C. Where a catalyst is used, an acid catalyst such as paratoluene sulphonic acid may be used. Also, an inert solvent such as hydrocarbons may be used.

The component (C) used in the esterification reaction is one or more of $\alpha,\beta$-unsaturated carboxylic acids including acrylic acid, methacrylic acid, crotonic acid and cinnamic acid.

In carrying out the above mentioned esterification, the objects of the present invention can be attained by reacting from 0.5 to 1 mol of an $\alpha,\beta$-unsaturated carboxylic acid with one equivalent mol of hydroxyl groups of the resin (II), but it is more preferable to use the $\alpha,\beta$-unsaturated carboxylic acid in a sufficient amount for the perfect esterification. When less than 0.5 mol of the acid is used, the curing speed of the esterified resin is reduced, thus leading to unpreferable results.

The curable resin (III) of the present invention which is obtained as mentioned above can be easily cured by heating or by projecting ultra-violet ray or radiation such as electron ray onto it, and therefore it is very preferable to use the resin as vehicle for paints or printing inks.

The softening point of the resin of this invention is generally from 30 to 150° C.; when the softening point is low, therein is easily melted by heating into fluidal state, and therefore paints or printing inks can be produced only by uniformly mixing pigments into said molten resin without using any solvent, whereas when softening point is high, paints or inks can be produced by blending pigments with the solvent solution of said resin. Although any of the various conventionally known solvents can be used as the solvent for said resin, it is preferable to use the below given reactive solvent in order to quickly and easily carry out curing thereof. Namely, as the solvent to be used in the present invention, one or a mixture of two or more of the reactive monomers each having double bond or bonds capable of being cross-linked with the esterified resin by heating or by the radiation with ultraviolet ray or electron ray: e.g., acrylic acid derivatives or vinyl compounds such as styrene can be preferably used, and, as the especially preferable examples of such reactive monomers, acrylic acid derivatives can be used.

As the specific examples of such compounds, the following can be given; reactive monomers having acryl or methacryl residues, such as
pentaerythritoltetra(meth-)acrylate,
pentaerythritoltri(meth-)acrylate,
trimethylolpropantri(meth-)acrylate,
ethyleneglycoldi(meth-)acrylate,
diethyleneglycoldi(meth-)acrylate,
1,3-butanedioldi(meth-)acrylate,
1,4-butanedioldi(meth-)acrylate,
1,6-hexanedioldi(meth-)acrylate,
2-hydroxyethyl(meth)acrylate,
2-hydroxypropyl(meth-)acrylate,
alkyl(meth-)acrylate(alkyl group having $C_1 \sim C_{18}$),
glycidyl(meth-)acrylate, etc.

(In the above given examples, (meth-) acrylate means acrylate or methacrylate.)

The curable coating composition, prepared by dissolving the curable resin of this invention into the above given reactive solvents, can be cured through cross-linking reaction by heating or the exposure to radiation very quickly and the quicker curing is the characteristic of this invention.

In addition, in the curing of the coating compositions of this invention, the used solvent is converted into a component of the coating material by cross-linking reaction, and, since the solvent is not evaporated out as in the case of the conventional organic solvents, there is no pollution problem at all as generally accompanied with the production of solvent vapor.

The above mentioned curable coating resin can be mixed with curing promoter for further promoting the curing thereof when said curable coating resin is used as the vehicle for paints or printing inks, which in most cases is preferred.

As the examples of such curing promoter as mentioned above, organic peroxides such as benzoyl peroxide, azobisisobutyronitrile or lauroyl peroxide, etc can be used independently or can be used along with decomposition promoters for the organic peroxide such as heavy metal salts, e.g. cobalt or manganese salts of organic acids or inorganic acids. Alternatively, ketone resin can be used as thermosetting promoter.

When the above mentioned composition is cured by exposing it to ultraviolet ray, various kinds of sensitizers such as benzoin ether, benzophenone, etc. can be used as curing promoters.

The curable resin (III) of the present invention may be used as vehicle for curable coating compositions, and is particularly suited for curable coating composition of inks. A practical example of the composition for such uses will be given below by way of example:

Resin (III) (Vehicle): 30–80 wt.%
Pigment: 5–30 wt.%
Sensitizer: 3—30 wt.%

In order to produce inks of low viscosity or inks for high speed printing, the aforementioned reactive solvent may be admixed to said resin (III) in an amount 60 half or less of that of the resin (III).

As the pigments used in the inks, there may be mentioned, for example, CARMIN 6B, Benzidine Yellow, Phthalocyanine Blue and carbon black.

The present invention will now be described with reference to the examples thereof. In the following examples, "part" stands for "parts by weight" unless otherwise specified.

EXAMPLES OF THE INVENTION

Example 1

660 g of 96% dicyclopentadiene and 470 g of phenol were charged into an autoclave provided with a stirrer and the reaction was carried out at 260° C. for 8 hours. After the reaction, the autoclave was cooled off and the reaction mixture was distilled, and then unreacted monomers and oligomers were removed. 850 g of the Resin (I)-1 were obtained. The softening point of the Resin (I)-1 was 103.5° C., the number average molecular weight was 480, and the hydroxyl content therein was 0.38 gram equivalent/100 g resin.

To a 50% solution of the Resin (I)-1 in n-butanol (solvent), Raney nickel catalyst in an amount of 5 wt.%, based on the weight of the resin, was added and the hydrogenation reaction was carried out under the hydrogen pressure of 70 kg/cm$^2$ at the reaction temperature of 160° C. for 5 hours. After the reaction, the catalyst was filtered off and the solvent was distilled off to obtain a Resin (II)-1. The hydroxyl content in the Resin (II)-1 was 0.35 gram equivalent/100 g resin. The resin was subjected to the infrared absorption spectrum analysis, but no substantial absorption due to the aromatic ring was observed.

Then, 100 g of the Resin (II)-1 were dissolved in 100 g of benzene (solvent), to which were added 25.2 g of acrylic acid, 1.0 g of paratoluene sulphonic acid and 0.1 g of hydroquinone, whereupon the esterification reaction was carried out at 80° C. for 10 hours. The solvent was distilled off to obtain an esterified Resin (III)-1.

Using the Resin (III)-1, the following composition was prepared:

Composition 1

Resin (III)-1: 70 g
Styrene: 30 g
Benzoinmethyl Ether: 3.5 g

The Composition 1 set forth above was coated on a metal plate by means of an applicator to form a 20μ thick coating which was exposed to an ultraviolet ray emitting from a 2 KW high pressure mercury lamp H-2000L (available from Tokyo Shibaura Electric Co., Ltd.) at a distance of 10 cm for a short period of time (3 sec.), whereby the coating was cured. The cured coating was insoluble in benzene, which showed that the resin was cross-linked during an extremely short period exposure.

Example 2

750 g of 96% dicyclopentadiene, 600 g of a commercially available cresolic acid mixture (composed of 30% of phenol, 10% of orthocresol, 25% of metacresol, 25% of paracresol and 10% of xylenol) and 750 g of mixed xylene were charged into an autoclave and reacted at 270° C. for 5 hours. The content was subjected to distillation to obtain 950 g of a Resin (I)-2 having the number average molecular weight of 520.

To a 50% solution of the Resin (I)-2 in xylene (solvent), Raney nickel catalyst in an amount of 5 wt.%, based on the weight of the resin was added, and the hydrogenation reaction was carried out under the hydrogen pressure of 50 kg/cm$^2$ at 180° C. for 3 hours. The catalyst was removed and the solvent was distilled off to obtain a Resin (II)-2. The softening point of the Resin (II)-2 was 105.0° C., and the hydroxyl content thereof was 0.33 grm. equivalent/100 g resin.

Then, 100 g of the Resin (II)-2 were dissolved in 100 g of benzene (solvent), to which were added 28.5 g of methacrylic acid, 1.0 g of paratoluene sulphonic acid and 0.1 g of hydroquinone, and the esterification reaction was carried out at 80° C. for 12 hours. The solvent was distilled off to obtain an esterified Resin (III)-2.

Using the Resin (III)-2 as vehicle, a red colored offset printing ink composition set forth below was prepared.

Composition 2

Resin (III)-2: 45 parts
Trimethylolpropanetriacrylate: 33 parts
CARMIN 6B(T) (Trade Name of Monoazo Pigment Available from Toyo Ink Mfg. Co., Ltd.): 16 parts
Benzophenone: 5 parts
4,4'-bisdiethylaminobenzophenone: 1 part Using HYDEL KORD monochromic off-set press (available from Heiderberger Bruckmachine AG), the thus obtained off-set printing ink was coated on art paper. The coated paper was put on a conveyer which was passing at the moving speed of 40 m/min. under a 2KW high pressure mercury lamp H-2000L (available from Tokyo Shibaura Electric Co., Ltd.) having the irradiation strength of 60 W/cm at a distance of 12 cm. The coated ink was dried, which showed that the resin had been cured during an extremely short period exposure. Also, the printability of the ink and the glossy property of the coated ink were both good.

Example 3

The by-product $C_5$ cracked oil fraction (boiling point: 28 to 60° C.) obtained in the process of producing ethylene, propylene and other compounds by steam cracking of naphtha, was heated at 120° C. for 4 hours and then the $C_5$ fraction was distilled off. The residue contained 85% of dicyclopentadiene and co-dimers of cyclopentadiene with isoprene or piperylene. 310 g of said fraction containing 85% of dicyclopentadiene, 230 g of bisphenol A and 230 g of dimethylcyclohexane were reacted in an autoclave at 270° C. for 4 hours to obtain a highly viscous resin solution.

20 g of the Raney nickel catalyst were added to the thus obtained resin solution, and the hydrogenation reaction was carried out under the hydrogen pressure of 50 kg/cm$^2$ at the reaction temperature of 180° C. for 5 hours. After the reaction, the catalyst was filtered off and the solvent, unreacted materials and oligomers were removed by distillation to obtain a hydrogenated Resin (II)-3. The hydroxyl content of the Resin (II)-3 was 0.30 gram equivalent/100 g resin.

Then, 100 g of the Resin (II)-3 were dissolved in a mixed solvent of benzene/methylisobutylketone, to which were added 22 g of acrylic acid, 1.0 g of paratoluene sulphonic acid and 0.1 g of hydroquinone and then reacted at 100° C. for 15 hours. The solvent was distilled off to obtain Resin (III)-3.

Using the Resin (III)-3, the following composition was prepared.

Composition 3

Resin (III)-3: 70 g
Styrene: 20 g
Trimethylolpropanetriacrylate: 10 g
dicumylperoxide: 2 g Using an applicator, the above Composition 3 was coated on a metal plate to form a 20μ thick coating which was perfectly cured by heating at 150° C. for 30 minutes. The cured coating was insoluble in acetone, which showed that the resin was cured to form crosslinkage.

Comparative Example 100 g of the unhydrogenated Resin (I)-1 obtained in Example 1 were dissolved in 100 g of benzene, to which were added 25.2 g of acrylic acid, 1.0 g of paratoluene sulphonic acid and 0.1 g of hydroquinone and the esterification reaction was carried out at the reaction temperature of 80° C. for 10 hours. However, the Resin (I)-1 was not esterified at all and the unreacted Resin (I)-1 was recovered. The non-esterified product was scarcely curable by heat or exposure to ultraviolet ray.

Although the present invention has been described with reference to the specific examples thereof, it should be understood that various modifications and variations can be easily made by those skilled in the art without departing from the spirit of the invention. It is intended to include all such modifications and variations within the wide scope of the present invention. What is claimed is:

1. A process for producing a curable resin which comprises the steps of:
   (i) polymerizing a five-member cyclic compound (A) having an unsaturated conjugated double bond and represented by the general formula (A) given below;

GENERAL FORMULA (A):

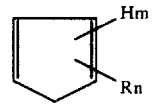

wherein R is an organic residue having from 1 to 3 carbon atoms; m and n are integers and are in the relation of m+n=6
or Diels-Alder addition product thereof (A) with at least one phenolic compound (B) selected from the group consisting of monohydric and polyhydric phenols and alkyl substituents thereof to obtain a resin (I) having at least one phenolic hydroxyl group and an average molecular weight of from 300 to 2000;
   (ii) hydrogenating said resin (I) to convert the aromatic ring of the phenolic compound unit into the cyclohexane structure thereby to obtain a resin (II); and
   (iii) esterifying said resin (II) with an α,β-unsaturated carboxylic acid (C).

2. The process for producing a curable resin according to claim 1 wherein said five-member cyclic compound (A) or the Diels-Alder addition product thereof (A) is one or more members selected from the group consisting of cyclopentadiene, dicyclopentadiene, tricyclopentadiene and tetracyclopentadiene and the lower alkyl substituents thereof having from 1 to 3 carbon atoms.

3. The process for producing a curable resin according to claim 1 wherein said phenolic compound (B) is one or more members selected from the group consisting of phenol, cresol, xylenol, tert-butylphenol, nonylphenol, resorcinol, bisphenol and alkyl substituents thereof.

4. The process for producing a curable resin according to claim 1 wherein in said step (i) for polymerizing said five-member cyclic compound (A) or Diels-Alder addition product thereof (A) with said phenolic compound (B), a compound (D) having from 3 to 20 carbon atoms and having both reactive carbon-carbon double bond or bonds and at least one alcoholic hydroxyl group is included in the reaction mixture.

5. The process for producing a curable resin according to claim 4 wherein said compound (D) is selected from one or more members of the group consisting of allyl alcohol, 2-hydroxyethyl methacrylate, 2-hydroxyethyl acrylate and 1,4-butenediol.

6. The process for producing a curable resin according to claim 1 wherein said α,β-unsaturated carboxylic acid (C) is one or more members selected from the group consisting of acrylic acid, methacrylic acid, crotonic acid and cinnamic acid.

7. The process for producing a curable resin according to claim 1, wherein said hydrogenation step (ii) is effected in the presence of a hydrogenation catalyst at a temperature of from room temp. to 280° C. under a hydrogen pressure of from atmospheric pressure to 150 kg/cm².

8. The process for producing a curable resin according to claim 1, wherein said resin (II) is esterified with said α,β-unsaturated carboxylic acid in the presence or absence of a catalyst at a temperature of from 20 to 150° C.

9. A curable coating composition comprising as vehicle a curable resin product of hydroxyl group-containing resin (II) esterified with an α,β-unsaturated carboxylic acid; said resin (II) being produced by the steps of:

(i) polymerizing a five-member cyclic compound (A) having an unsaturated conjugated double bond and represented by the general formula (A) given below;

GENERAL FORMULA (A):

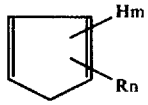

or wherein R is an organic residue having from 1 to 3 carbon atoms; m and n are integers and are in the relation of m+n=6
or Diels-Alder addition product thereof (A) with at least one phenolic compound (B) selected from the group consisting of monohydric and polyhydric phenols and alkyl substituents thereof to obtain a resin (I) having at least one phenolic hydroxyl group and an average molecular weight of from 300 to 2000; and (ii) hydrogenating said resin (I) to convert the aromatic ring of said phenolic compound unit into the cyclohexane structure thereby to obtain said resin (II).

10. The curable coating composition according to claim 9 wherein said five-member cyclic compound (A) or the Diels-Alder addition product thereof (A) is one or more members selected from the group consisting of cyclopentadiene, dicyclopentadiene, tricyclopentadiene and tetracyclopentadiene and the lower alkyl substituents thereof having from 1 to 3 carbon atoms.

11. The curable coating composition according to claim 9 wherein said phenolic compound (B) is one or more members selected from the group consisting of phenol, cresol, xylenol, tert-butylphenol, nonylphenol, resorcinol, bisphenol and alkyl substituents thereof.

12. The curable coating composition according to claim 9 wherein a compound (D) having from 3 to 20 carbon atoms and having both reactive carbon-carbon double bond or bonds and at least one alcoholic hydroxyl group is added to and copolymerized with said five-member cyclic compound (A) or the Diels-Alder addition product (A) and said phenolic compound (B).

13. The curable coating composition according to claim 12 wherein said compound (D) is one or more members selected from the group consisting of allyl alcohol, 2-hydroxyethyl methacrylate, 2-hydroxyethyl acrylate and 1,4-butenediol.

14. The curable coating composition according to claim 9 wherein said α,β-unsaturated carboxylic acid (C) is one or more members selected from the group consisting of acrylic acid, methacrylic acid, crotonic acid and cinnamic acid.

15. The curable coating composition according to claim 9, further comprising as solvent one or a mixture of two or more of the reactive monomers each having double bond or bonds capable of being cross-linked with the esterified resin by heating or by exposure to the radiation of ultraviolet ray or electron ray.

16. The curable coating composition according to claim 15 wherein said reactive monomer has an acryl or methacryl residue and is selected from the group consisting of pentaerythritol tetraacrylate or methacrylate, pentaerythritol triacrylate or methacrylate, trimethylolpropanetriacrylate or methacrylate, ethylene glycoldiacrylate or methacrylate, diethyleneglycoldiacrylate or methacrylate, 1,3-butanedioldiacrylate or methacrylate, 1,4-butanediol diacrylate or methacrylate, 1,6-hexanedioldiacrylate or methacrylate, 2-hydroxyethylacrylate or methacrylate, 2-hydroxypropylacrylate or methacrylate, alkylacrylate or methacrylate (alkyl group having $C_1-C_{18}$) and glycidyl acrylate or methacrylate.

17. The curable coating composition according to claim 9, comprising 30 to 80% by weight of said esterified curable resin product, 5 to 30% by weight of pigment and 3 to 30% by weight of sensitizer.

18. The curable coating composition according to claim 9, 10, 11, 12, 13 or 14 wherein said composition is used for paint.

19. The curable coating composition according to claim 9, 10, 11, 12, 13 or 14 wherein said composition is used for printing ink.

* * * * *